United States Patent [19]
Koshirai et al.

[11] Patent Number: 5,288,798
[45] Date of Patent: Feb. 22, 1994

[54] POLYARYLENE SULFIDE RESIN COMPOSITIONS

[75] Inventors: Atsunori Koshirai; Akira Nakata; Naoki Yamamoto, all of Otake, Japan

[73] Assignee: Mitsubishi Rayon Co., Ltd., Tokyo, Japan

[21] Appl. No.: 8,181

[22] Filed: Jan. 25, 1993

Related U.S. Application Data

[63] Continuation-in-part of Ser. No. 741,662, Aug. 7, 1991, abandoned.

Foreign Application Priority Data

Aug. 22, 1990 [JP] Japan ................... 2-220349

[51] Int. Cl.$^5$ ............................................ C08L 51/08
[52] U.S. Cl. ...................................... 525/63; 525/479; 525/537; 525/903
[58] Field of Search ............... 525/63, 479, 903, 537

[56] References Cited

U.S. PATENT DOCUMENTS 4,454,284  6/1984  Ueno et al. ..................... 524/427

FOREIGN PATENT DOCUMENTS

| | | |
|---|---|---|
| 0142825 | 5/1985 | European Pat. Off. . |
| 0332188 | 9/1989 | European Pat. Off. . |
| 0367219 | 5/1990 | European Pat. Off. . |
| 0369244 | 5/1990 | European Pat. Off. . |
| 0369245 | 5/1990 | European Pat. Off. . |
| 0389905 | 10/1990 | European Pat. Off. . |
| 63-27559 | 2/1988 | Japan . |

*Primary Examiner*—Ralph H. Dean
*Attorney, Agent, or Firm*—Cushman, Darby & Cushman

[57] ABSTRACT

A polyarylene sulfide resin composition obtained by melt-mixing a mixture comprising resin components comprising as main resins
(A) a polyarylene sulfide resin and
(B) a polyorganopsiloxane graft copolymer obtained by graft-polymerizing one or more kinds of vinyl monomer containing at least an epoxy group-containing vinyl monomer onto a compound rubber in which a polyorganosiloxane rubber and a polyalkyl (meth)acrylate rubber have been inseparably united with each other. The composition of the present invention, whether it contains a filler or not, is excellent in compatibility between the polyarylene sulfide resin and polyorganosiloxane graft copolymer. If this composition is extrusion-molded or injection-molded under the common molding conditions, it keeps its original dispersed and mixed condition without showing a phase separation. Consequently, this composition has an excellent performance that impact resistance also has been given to the polyarylene sulfide resin without largely injuring excellent properties inherent to the resin. Particularly, this composition is very little deteriorated in impact strength when it is put in wet heat conditions under pressure, and therefore it is usable in such conditions.

8 Claims, No Drawings

POLYARYLENE SULFIDE RESIN COMPOSITIONS

CROSS-REFERENCE TO RELATED APPLICATION

This application is a continuation-in-part of U.S. patent application Ser. No. 07/741,662 filed Aug. 7, 1991, now abandoned.

BACKGROUND OF THE INVENTION

1. Field of the Invention

The present invention relates to a polyarylene sulfide resin composition excellent in impact strength and heat resistance.

2. Description of the prior Art

Various polyarylene sulfide resin compositions are proposed as a composition in which the impact resistance of a polyarylene sulfide resin has been improved. For example, EP-A2-0142825 discloses a composition obtained by blending the resin with a silicone rubber, ethylene/acrylic rubber, EP rubber, EPDM and butyl acrylate rubber. Japanese Patent Application Kokai No. 63-27559 discloses a composition obtained by blending the resin with a graft acrylic rubber, and EP-A2-0367219 discloses a composition obtained by blending the resin with a graft silicone rubber obtained by graft-polymerizing an epoxy group-containing vinyl monomer onto a polyorganosiloxane polymer.

However, the composition proposed in EP-A2-0142825 and Japanese Patent Application Kokai No. 63-27559 have a problem that compatibility between the polyarylene sulfide resin and any one of the above rubbers is extremely so poor that it is difficult to improve the impact strength of the resin without doing great damage to the heat resistance and mechanical properties inherent to the polyarylene sulfide resin. Also, the composition proposed in EP-A2-0367219, although it is relatively good among these compositions, has a problem that improvement of the impact strength is still insufficient and molded products of the composition are poor in surface appearance. This composition further has a problem that when it is put in wet heat conditions under pressure, its impact strength becomes remarkably poor.

SUMMARY OF THE INVENTION

In view of the situation mentioned above, the present inventors have extensively studied to obtain a polyarylene sulfide resin composition which is improved in impact strength without much injuring the heat resistance and mechanical characteristics inherent to the polyarylene sulfide resin and, in particular, which is improved in impact strength even after it is put in wet heat conditions under pressure. As a result, the present inventors have found that the above object can be attained by blending the polyarylene sulfide resin with a polyorganosiloxane graft copolymer resin obtained by graft-polymerizing one or more kinds of vinyl monomer containing at least an epoxy group-containing vinyl monomer onto a compound rubber in which a polyorganosiloxane rubber and a polyalkyl (meth)acrylate rubber have been inseparably united with each other. The present inventors thus attained to the present invention.

The gist of the present invention consists in a polyarylene sulfide resin composition obtained by melt-mixing a mixture comprising resin components comprising as main resins (A) a polyarylene sulfide resin and (B) a polyorganosiloxane graft copolymer obtained by graft-polymerizing one or more kinds of vinyl monomer containing at least an epoxy group-containing vinyl monomer onto a compound rubber in which a polyorganosiloxane rubber and a polyalkyl (meth)acrylate rubber have been inseparably united with each other. The composition of the present invention, whether it contains a filler or not, is excellent in compatibility between the polyarylene sulfide resin and polyorganosiloxane graft copolymer. If this composition is extrusion-molded or injection-molded under the common molding conditions, it keeps its original dispersed and mixed condition without showing a phase separation. Consequently, this composition has an excellent performance that impact resistance also has been given to the polyarylene sulfide resin without largely injuring excellent properties inherent to the resin. Particularly, this composition is very little deteriorated in impact strength when it is put in wet heat conditions under pressure, and therefore it is usable in such conditions.

DESCRIPTION OF THE PREFERRED EMBODIMENTS

The polyarylene sulfide resin used in the present invention is a polymer having as a main constituent unit a repeating unit represented by the formula,

wherein Ar is one or more members selected from the group consisting of

and their derivative having 1 to 8 substituents (e.g. a halogen atom and methyl group) at the aromatic rings. In the above formula,

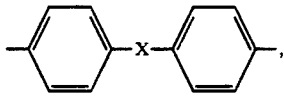

X represents $-SO_2-$, $-CO-$, $-O-$ or an alkylene group of which the main chain has 1 to 5 carbon atoms and which may have a lower alkyl side chain. This polymer may be composed of a straight-chain structure alone, or may contain a branched chain. Further, it may have a cross-linked structure so far as it has a melt-processability.

A polyphenylene sulfide resin is preferred as the polyarylene sulfide resin used in the present invention.

The polyorganosiloxane graft copolymer used in the present invention is obtained by graft-polymerizing one or more kinds of vinyl monomer containing at least an epoxy group-containing vinyl monomer onto a compound rubber comprising a polyorganosiloxane rubber and a polyalkyl (meth)acrylate rubber. As the polyorganosiloxane rubber used herein, there can be used those which are obtained in the form of fine particles by emulsion polymerization of organosiloxane, a crosslinking agent for the polyorganosiloxane rubber (hereinafter referred to as crosslinking agent (I)) and if necessary a graft-linking agent for the polyorganosiloxane rubber (hereinafter referred to as graft-linking agent (I)).

As the organosiloxane used to prepare the polyorganosiloxane rubber, three or more-membered cyclic organosiloxanes are used, among which three to six-membered ones are preferably used. Examples of such the cyclic organosiloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These cyclic organosiloxanes may be used alone or in mixture of two or more of them.

As the crosslinking agent (I) used to prepare the polyorganosiloxane rubber, trifunctional or tetrafunctional silanes, i.e. trialkoxyalkylsilanes, trialkoxyarylsilanes or tetraalkoxysilanes are used. Specific examples of such the crosslinking agent (I) include trimethoxymethylsilane, triethoxyphenylsilane, tetramethoxysilane, tetraethoxysilane, tetra-n-propoxysilane, tetrabutoxysilane and the like. As the crosslinking agent (I), tetraalkoxysilanes are preferred, among which tetraethoxysilane is particularly preferably used.

The graft-linking agent (I) used if necessary to prepare the polyorganosiloxane rubber is a siloxane having a functional group which does not react at the step of preparation of the polyorganosiloxane rubber, but reacts at the subsequent steps, i.e. at the step of preparation of the compound rubber in which the poly(meth)acrylate rubber is prepared by polymerization in the presence of the polyorganosiloxane rubber, and the step of graft polymerization. As specific examples, compounds which can form a unit represented by either one of the formulae (I-1), (I-2), (I-3) and (I-4) are given:

$$CH_2=CCOO(CH_2)_pSiR_n^1O_{(3-n)/2} \quad \overset{R^2}{|} \quad (I-1)$$

$$CH_2=CHSiR_n^1O_{(3-n)/2} \quad (I-2)$$

$$HS(CH_2)_pSiR_n^1O_{(3-n)/2} \quad (I-3)$$

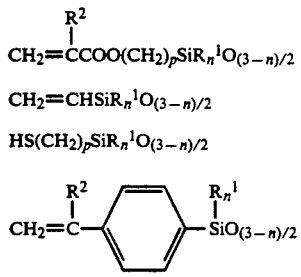 (I-4)

wherein $R^1$ represents a methyl, ethyl, propyl or phenyl group, $R^2$ represents a hydrogen atom or a methyl group, n represents an integer of 0, 1 or 2, and p represents an integer of 1 to 6.

(Meth)acryloyloxyalkylsiloxane which can form the unit represented by the formula (I-1) is desirable because it has a high grafting efficiency which makes it possible to form graft chains efficiently, as a result of which the composition of the present invention prepared therefrom acquires more superior impact resistance. Among (meth)acryloyloxyalkylsiloxanes capable of forming the unit represented by the formula (I-1), methacryloyloxyalkylsiloxane is preferred. Specific examples of methacryloyloxyalkylsiloxane include β-methacryloyloxyethyldimethoxymethylsilane; γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the like. Vinylsiloxane which can form the unit represented by the formula (I-2) includes vinylmethyldimethoxysilane, vinyltrimethoxysilane and the like. Mercaptosiloxane which can form the unit represented by the formula (I-3) includes γ-mercaptopropyldimethoxymethylsilane, γ-mercaptopropyltrimethoxysilane, γ-mercaptopropyldiethoxyethylsilane and the like. Compounds which can form the unit represented by the formula (I-4) include p-vinylphenylmethyldimethoxysilane and the like.

The amount of the component derived from the cyclic organosiloxane is 60 wt. % or more, preferably 70 wt. % or more of the polyorganosiloxane rubber. The amount of the component derived from the crosslinking agent (I) is 0.1 to 30 wt. % thereof, and that of the component derived from the graft-linking agent (I) is 0 to 10 wt. %.

For producing the latex of this polyorganosiloxane rubber component, methods described, for example, in USP No. 2891920, No. 3294725, et. can be used. In practicing the present invention, it is preferred to produce the latex by the method in which a mixed solution of organosiloxane, the crosslinking agent (I) and if necessary the graft-linking agent (I) is shear-mixed with water with, for example, a homogeneizer in the presence of a sulfonic acid emulsifier such as an alkylbenzenesulfonic acid, an alkylsulfonic acid and the like. As the sulfonic acid emulsifier, an alkylbenzenesulfonic acid is preferably used because it acts as an emulsifier for organosiloxane and at the same time acts as a polymerization initiator. In this case, it is preferred to use a metal salt of the alkylbenzenesulfonic acid or an alkylsulfonic acid together with the above sulfonic acid because the metal salt has an effect to keep the emulsified state of the polymer stable during the graft polymerization.

For producing the compound rubber, it is desirable to use the emulsion polymerization method. That is, it is desirable to firstly prepare the polyorganosiloxane rubber by the emulsion polymerization method, and then to subject a monomer for synthesizing the polyalkyl (meth)acrylate rubber to emulsion polymerization in the presence of the polyorganosiloxane rubber latex prepared above.

The polyalkyl (meth)acrylate rubber component constituting the compound rubber can be synthesized using an alkyl (meth)acrylate, a crosslinking agent for the polyalkyl (meth)acrylate rubber component (hereinafter referred to as crosslinking agent (II)) and a graft-linking agent for the same (hereinafter referred to as graft-linking agent (II)).

The alkyl (meth)acrylate includes alkyl acrylates (e.g. methyl acrylate, ethyl acrylate, n-propyl acrylate, n-butyl acrylate, 2-ethylhexyl acrylate) and alkyl methacrylates (e.g. hexyl methacrylate, 2-ethylhexyl methacrylate, n-lauryl methacrylate). Among the alkyl (meth)acrylates, n-butyl acrylate is preferably used.

As the crosslinking agent (II), polyfunctional (meth)acrylates can be used. Specific examples thereof include ethylene glycol dimethacrylate, propylene glycol dimethacrylate, 1,3-butylene glycol dimethacrylate, 1,4-butylene glycol dimethacrylate, allyl methacrylate and the like.

As the graft-linking agent (II), compounds having two kinds of unsaturated group different in reactivity therebetween are used. Examples of such the compound include allyl methacrylate, triallyl cyanulate, triallyl isocyanulate and the like. The three allyl groups of both triallyl cyanulate and triallyl isocyanulate seem to have reactivity of the same level, but after a first allyl group has reacted, second and third allyl groups react in different reactivity from that of the first one. Triallyl cyanulate and triallyl isocyanulate, therefore, can be considered to have unsaturated groups different in reactivity. In the case of allyl methacrylate having two unsaturated groups, one of the groups having lower reactivity also reacts in part during polymerization to work as crosslinking site, but does not react in full, so that the remaining unsaturated group works as grafting site during the subsequent graft polymerization. These crosslinking agents (II) and graft-linking agents (II) can be used alone or in combination of two or more of them. Hereupon, it is desirable to cause allyl methacrylate to own the functions of the both, i.e. to use allyl methacrylate both as a crosslinking agent for the polyalkyl (meth)-acrylate rubber and as a graft-linking agent for the same.

The amount of any one of these crosslinking agent (II) and graft-linking agent (II) used is 0.1 to 10 wt. % of the polyalkyl (meth)acrylate rubber component. When allyl methacrylate is used as both the crosslinking agent (II) and the graft-linking agent (II), an effect that there is no need to further use other crosslinking agent (II) and graft-linking agent (II) is obtained by using the allyl methacrylate in amounts of 0.2 to 20 wt. % of the polyalkyl (meth)acrylate rubber component.

The polyalkyl (meth)acrylate rubber component can be formed by adding the above alkyl (meth)acrylate, crosslinking agent (II) and graft-linking agent (II) to the polyorganosiloxane rubber latex and subjecting the mixture to polymerization. These alkyl (meth)acrylate and both agents (II) may be added either in one portion or dropwise to the polymerization system. With the progress of the polymerization, the polyalkyl (meth)-acrylate rubber component formed by the polymerization and the polyorganosiloxane rubber component are entangled and united with each other at the interface of the both to form a crosslinked network. Particularly, when the graft-linking agent (I) has been used in producing the polyorganosiloxane rubber component, grafting of the polyalkyl (meth)acrylate rubber component onto the polyorganosiloxane rubber component also takes place. In either case, a compound rubber latex which cannot substantially be separated into both the rubber components is obtained.

This compound rubber has a structure that the polyorganosiloxane rubber component and polyalkyl (meth)-acrylate rubber component have been entangled in part, united with each other and crosslinked in that state, so that it cannot be separated into both the rubber components by extraction with usual organic solvents such as acetone, toluene, etc.

A preferred compound rubber is one in which the component derived from the cyclic organosiloxane in the polyorganosiloxane rubber component has a repeating unit of dimethylsiloxane, and the alkyl (meth)acrylate constituting the polyalkyl (meth)acrylate rubber component is n-butyl acrylate.

The compound rubber is one which has such a structure that 1 to 99 wt. % of the polyorganosiloxane rubber component and 99 to 1 wt. % of the plyalkyl (meth)-acrylate rubber component have been inseparably entangled and united with each other, and in which the total amount of both the components is 100 wt. %.

When the compound rubber in which the amount of the polyorganosiloxane rubber component exceeds 99 wt. % is used, the composition obtained therefrom gives molded products having a poor surface appearance. When the compound rubber in which the amount of the polyalkyl (meth)acrylate rubber component exceeds 99 wt. % is used, the composition obtained therefrom is low in impact resistance. Because of this, the compound rubber used in the present invention needs to be one in which the amount of any one of both the rubber components is in a range of 1 to 99 wt. %, provided that the total amount of both the components is 100 wt. %. Preferably, the amount of the polyorganosiloxane rubber component is 5 to 80 wt. %, and that of the polyalkyl (meth)acrylate rubber component is 95 to 20 wt. %.

The compound rubber thus obtained is graft-copolymerizable with a vinyl monomer.

The polyorganosiloxane graft copolymer is obtained by graft-polymerizing one or more kinds of vinyl monomer containing at least an epoxy group-containing vinyl monomer onto this compound rubber. If the graft copolymer is constituted so that the component derived from the epoxy group-containing vinyl monomer is contained in amounts of 1 to 40 wt. %, preferably 5 to 30 wt. % of the graft copolymer, other vinyl monomer than the epoxy group-containing vinyl monomer may be graft-polymerized together. When the amount of the component derived from the epoxy group-containing vinyl monomer is less than 1 wt. % of the graft copolymer, compatibility between the polyarylene sulfide resin and polyorganosiloxane graft copolymer tends to become poor. On the other hand, when the amount exceeds 40 wt. %, performance as rubber of the polyorganosiloxane graft copolymer lower, as a result of which the impact strength of the resin composition of the present invention tends to lower and at the same time there is a fear that the resin composition turns gel at the time of melt-kneading. Such that contents are not therefore desirable.

The epoxy group-containing vinyl monomer includes glycidyl methacrylate, glycidyl acrylate, vinyl glycidyl ether, allyl glycidyl ether, glycidyl ether of hydroxyalkyl (meth)acrylate, glycidyl ether of polyalkylene glycol (meth)acrylate, diglycidyl itaconate and the like. Among these, glycidyl methacrylate is preferably used.

The vinyl monomer copolymerizable with the epoxy group-containing vinyl monomer includes methacrylates (e.g. methyl methacrylate, 2-ethylhexyl methacrylate), acrylates (e.g. methyl acrylate, ethyl acrylate, butyl acrylate), aromatic alkenyl compounds (e.g. styrene, halogen-substituted styrene, α-methylstyrene, vinyltoluene) and vinyl cyanide compounds (e.g. acrylonitrile, methacrylonitrile). These monomers are used alone or in combination of two or more of them.

The proportion of the component derived from the grafted vinyl monomer in the graft copolymer is preferably 5 to 50 wt. %, more preferably 10 to 30 wt. % when the weight of the graft copolymer is taken as 100 wt. %.

Also, it is desirable for the polyorganosiloxane graft copolymer to have an average particle size ranging from 0.08 to 0.6 μm. When the average particle size is less than 0.08 μm, it is liable to become difficult to obtain sufficient impact strength. When it is larger than 0.6 μm, there is a fear that the composition obtained gives molded products having a poor surface appearance. The polyorganosiloxane graft copolymer having such the average particle size can be obtained by one-stage or multi-stage emulsion graft-polymerization of one or more kinds of monomer containing the epoxy group-containing vinyl monomer in the presence of the above compound rubber latex. When the multi-stage graft-polymerization is carried out using the epoxy group-containing vinyl monomer and other monomer than the one above as the aforementioned one or more kinds of monomer containing the epoxy group-containing vinyl monomer, it is desirable to add the epoxy group-containing vinyl monomer at the last stage of the graft polymerization.

In this graft polymerization, the component alone corresponding to the branch of the graft copolymer, which refers herein to a component derived from one or more kinds of monomer containing the epoxy group-containing vinyl monomer, polymerizes by itself without grafting onto a trunk component which refers herein to the compound rubber, to produce the so-called free polymer as by-product. In other words, a mixture of the desired graft copolymer and the free polymer is obtained by the graft polymerization. In the present invention, however, this mixture is referred to as "graft copolymer".

The blending amount of the polyarylene sulfide resin and the polyorganosiloxane graft copolymer is preferably 1 to 70 parts by weight, more preferably 5 to 40 parts by weight of the polyorganosiloxane graft copolymer per 100 parts by weight of the polyarylene sulfide resin in terms of the impact strength of the composition obtained. When the proportion of the polyorganosiloxane graft copolymer is less than 1 part by weight, an effect to improve the impact resistance of the polyarylene sulfide resin is poor. When the proportion exceeds 70 parts by weight, the strength, stiffness and heat resistance of molded products obtained from the composition tend to be injured.

So far as the composition of the present invention contains the above resin components in the above blending ratio, a filler can be incorporated as an additional component into the composition in order to further improve the heat resistance, mechanical strength, etc. of the composition. As such the filler, those having a fibrous form, granular form, powdery form, etc. may be used.

The filler includes for example glass fibers, carbon fibers, potassium titanate, asbestos, silicon carbide, ceramics fibers, metal fibers, silicon nitride, aramide fibers, barium sulfate, calcium sulfate, calcium silicate, calcium carbonate, magnesium carbonate, antimony trioxide, zinc oxide, titanium oxide, magnesium oxide, iron oxide, molybdenum disulfide, mica, talc, kaolin, pyrophyllite, bentonite, sericite, zeolite, wollastonite, other clays, ferrite, graphite, gypsum, glass beads, glass balloons, quartz, etc.

When these fillers are used, their amount used is preferably 10 to 300 parts by weight per 100 parts by weight of the total amount of the resin components comprising as main resins the polyarylene sulfide resin and polyorganosiloxane graft copolymer. When the amount is less than 10 parts by weight, an effect to improve the heat resistance, mechanical strength, etc. is small. When the amount exceeds 300 parts by weight, the melt-flowability of the composition becomes so poor that there is a fear that the appearance of molded products is injured.

If necessary, plasticizers, flame retardants, lubricants, pigments, etc. may be incorporated into the resin composition of the present invention.

For producing the resin composition of the present invention, any means may be used as far as the resin composition is obtained by melt-mixing at least the polyarylene sulfide resin and the polyorganosiloxane graft copolymer. It is however desirable to employ the following method: Firstly, the polyorganosiloxane graft copolymer latex is added to an aqueous metal salt solution containing, for example, calcium chloride or magnesium sulfate to salt it out and coagulate it, and the coagulated product is separated, recovered and dried. And then, the polyorganosiloxane graft copolymer dry powder thus obtained, the polyarylene sulfide resin and if necessary, the filler are added to an extruder, melt-kneaded and pelletized. The pellet thus obtained can be molded over a wide temperature range, and for example, it can be molded on a common injection molding machine.

The present invention will be illustrated specifically with reference to the following examples. In the examples, "part" means "part by weight". Physical properties in the examples and comparative examples were measured by the following methods under absolutely dried conditions.

Average particle size:

Measured according to the quasi-elastic light scattering method (MALVERN SYSTEM 4600; measurement temperature, 25° C.; angle of scattering, 90 degrees) using an aqueous dilute solution of the latex as sample solution.

Izod impact strength:

Measured according to ASTM D-256 using a test piece with a ⅛" notch. Heat distortion temperature (HDT):

Measured according to ASTM D-648 using a high load of 18.6 kg/cm².

Surface appearance:

Evaluated in two stages by visual assessment.

o No pearly luster.

x Pearly luster is observed.

Wet heat property:

A test piece is subjected to a pressure cooker test at 120° C. and 100% RH for 100 hrs and thereafter measured for Izod impact strength.

Referential Example 1

Production of polyorganosiloxane graft copolymer (S-1)

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture.

0.67 part of sodium dodecylbenzenesulfonate and 0.67 part of dodecylbenzenesulfonic acid were dissolved in 200 parts of distilled water, and the resulting mixture was added to 100 parts of the above siloxane mixture. The resulting mixture was preliminarily stirred at 10000 rpm with a homomixer and then emulsified with a homogenizer under a pressure of 200 kg/cm² to obtain an organosiloxane latex. This latex was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 7.2 with an aqueous sodium hydroxide solution to complete polymerization. Thus, a polyorganosiloxane rubber latex (hereinafter referred to as PDMS-1) was obtained. The conversion of the siloxane mixture to the polyorganosiloxane rubber was 89.1%, and the average particle size of the polyorganosiloxane rubber was 0.19 μm.

35 Parts of PDMS-1 was sampled and put in a separable flask equipped with a stirrer. After 255 parts of distilled water was added and the atmosphere in the flask was replaced by a nitrogen gas, the contents of the flask were heated to 50° C. At this temperature, a mixed solution of 78.4 parts of n-butyl acrylate, 1.6 parts of allyl methacrylate and 0.3 part of tert-butyl hydroperoxide was added to allow the mixed solution to soak into the polyorganosiloxane rubber particles. Thereafter, a mixed solution of 0.002 part of ferrous sulfate, 0.006 part of disodium ethylenediaminetetraacetate, 0.3 part of Rongalite and 10 parts of distilled water was added, and radical polymerization was carried out while maintaining the inner temperature at 70° C. for 2 hours to obtain a compound rubber latex.

To this compound rubber latex was dropwise added a mixed solution of 10 parts of glycidyl methacrylate and 0.024 part of tert-butyl hydroperoxide over 15 minutes, and graft polymerization onto the compound rubber was carried out while maintaining the reaction solution at an inner temperature of 60° C. for 2 hours. The conversion of glycidyl methacrylate was 98.5%, and the average particle size of the graft copolymer was 0.24 μm. This latex was added to a 5% aqueous calcium chloride solution at 40° C. so that the ratio of the latex to the aqueous solution was 1:2. Thereafter, the mixed solution was heated to 90° C. to coagulate the latex. After cooling, the solid matter was filtered off and dried overnight at 80° C. to obtain a powdery polyorganosiloxane graft copolymer (hereinafter referred to as S-1).

Referential Examples 2 and 3

A compound rubber latex was obtained in the same manner as in Referential Example 1 except that:
(1) PDMS-1 obtained in the course of production of S-1 was sampled in amounts shown in Table 1.
(2) distilled water was added thereto in amounts shown in Table 1, and
(3) n-butyl acrylate and allyl methacrylate were used in amounts shown in Table 1.

To this compound rubber latex was dropwise added a mixed solution of 10 parts of methyl methacrylate and 0.03 part of cumene hydroperoxide over 20 minutes. After completion of the addition, the inner temperature was kept at 60° C. for 1 hour, after which a mixed solution of 5 parts of glycidyl methacrylate and 0.015 part of cumene hydroperoxide was dropwise added thereto over 10 minutes. After completion of the addition, the inner temperature was kept at 60° C. for 2 hours to complete graft polymerization. Thereafter, coagulation and drying were carried out in the same manner as in Referential Example 1 to obtain polyorganosiloxane graft copolymers S-2 and S-3. The average particle size of these copolymers are shown in Table 1.

TABLE 1

| | S-2 | S-3 |
|---|---|---|
| Distilled water (part) | 175 | 175 |
| PDMS-1 (part) | 138 | 241 |
| n-Butyl acrylate (part) | 42 | 12 |
| Allyl methacrylate (part) | 0.8 | 0.24 |

TABLE 1-continued

| | S-2 | S-3 |
|---|---|---|
| Average particle size (μm) | 0.24 | 0.23 |

Referential Examples 4 to 5

274 parts of the compound rubber latex obtained in the course of production of S-1 was put in a separable flask equipped with a stirring blade. After atmosphere in the flask was replaced by a nitrogen gas, the contents of the flask were heated to 60° C. At this temperature, a mixed solution of 7.5 parts of glycidyl methacrylate, each of monomers shown in Table 2 and 0.04 part of cumene hydroperoxide was dropwise added thereto over 20 minutes. After completion of the addition, graft polymerization onto the polyorganosiloxane rubber was carried out while maintaining the inner temperature at 60° C. for 2 hours. Thereafter, coagulation and drying were carried out in the same manner as in Referential Example 1 to obtain polyorganosiloxane graft copolymers S-4 to S-5. The average particle size of these copolymers are 0.24 μm.

Referential Example 6

283 parts of PDMS-1 was put in a separable flask equipped with a stirring blade, atmosphere in the flask was replaced by a nitrogen gas and the contents of the flask was heated to 60° C. At this temperature, a mixed solution of 0.002 part of ferrous sulfate, 0.006 part of disodium ethylenediaminetetraacetate, 0.3 part of Rongalite and 10 parts of distilled water was added thereto. Thereafter, a mixed solution of 10 parts of methyl methacrylate and 0.03 part of cumene hydroperoxide was dropwise added thereto over 20 minutes. After completion of the addition, the inner temperature was kept at 60° C. for 1 hour, after which a mixed solution of 5 parts of glycidyl methacrylate and 0.015 part of cumene hydroperoxide was dropwise added thereto over 10 minutes. After completion of the addition, the inner temperature was kept at 60° C. for 2 hours to complete graft polymerization. The number average particle size of the graft copolymer latex obtained was 0.21 μm. Thereafter, coagulation and drying were carried out in the same manner as in Referential Example 1 to obtain a polyorganosiloxane graft copolymer (hereinafter referred to as S-6).

Referential Example 7

200 Parts of distilled water and 1 part of sodium dodecylbenzenesulfonate were put in a separable flask equipped with a stirring blade. After atmosphere in the flask was replaced by a nitrogen gas, the contents of the flask was heated to 50° C. At this temperature, a mixed solution of 83.5 parts of n-butyl acrylate, 1.5 parts of allyl methacrylate and 0.3 part of cumene hydroperoxide was added thereto. Thereafter, a mixed solution of 0.002 part of ferrous sulfate, 0.006 part of disodium ethylenediaminetetraacetate, 0.3 part of Rongalite and 10 parts of distilled water was added thereto. Radical polymerization was then carried out while maintaining the reaction solution at an inner temperature of 70° C. for 2 hours to obtain a polyacrylate rubber latex.

To this rubber latex was dropwise added a mixed solution of 10 parts of methyl methacrylate and 0.03 part of cumene hydroperoxide over 20 minutes. After completion of the addition, the inner temperature was kept at 60° C. for 1 hour, after which a mixed solution of 5 parts of glycidyl methacrylate and 0.015 parts of cumene hydroperoxide was dropwise added thereto over 10 minutes. After completion of the addition, the inner temperature was kept at 60° C. for 2 hours to complete graft polymerization. Thereafter, coagulation and drying were carried out in the same manner as in Referential Example 1 to obtain a polyacrylate rubber graft copolymer (hereinafter referred to as S-7).

Referential Example 8

The dry powder of a polyorganosiloxane graft copolymer (hereinafter referred to as S-8) was obtained in the same manner as in Referential Example 1 except that as a monomer to be grafted onto the polyorganosiloxane compound rubber, 10 parts of methyl methacrylate was used in place of 10 parts of glycidyl methacrylate.

Examples 1 to 10 and Comparative Examples 1 to 5

Tohpren T-4 and Ryton M2588 were used as the polyarylene sulfide resin. Each of these resins was blended with each of the polyorganosiloxane graft copolymers S-1 to S-5 obtained in Referential Examples 1 to 5, respectively, in a proportion shown in Table 2. Each mixture was pelletized through a twin-screw extruder (TEM-35B, produced by Toshiba Machine Co., Ltd.) at a cylinder temperature of 300° C. After this pellet was dried, it was molded into test pieces for measuring various physical properties with an injection molding machine (Promat injection molding machine, produced by Sumitomo Heavy Industries, Ltd.) at a cylinder temperature of 300° C. and at a mold temperature of 140° C. The physical properties were then evaluated. The results of evaluation of the physical properties are shown in Table 2.

For comparison, test pieces for measuring the physical properties were prepared, and evaluation of the physical properties was carried out in the same manner as above except that test samples described in the following Comparative Examples were used in place of the polyorganosiloxane graft copolymer:

(1) In Comparative Example 1, a rubber (hereinafter referred to as S-9) obtained by coagulating and drying the polyorganosiloxane rubber latex PDMS-1 obtained in the course of production of S-1 in Referential Example 1, was used in place of the polyorganosiloxane graft copolymer.

(2) In Comparative Example 2, the coagulated and dried product (hereinafter referred to as S-10) of the compound rubber obtained in the course of production of S-1 in Referential Example 1, was used in place of the polyorganosiloxane graft copolymer.

(3) In Comparative Example 3, a copolymer obtained by grafting a monomer containing the epoxy group-containing vinyl monomer onto a polyorganosiloxane homorubber, was used in place of the polyorganosiloxane copolymer used in the present invention.

(4) In Comparative Example 4, a copolymer obtained by grafting the monomer containing the epoxy group-containing vinyl monomer onto a polyacrylate rubber, was used.

(5) In Comparative Example 5, a copolymer obtained by grafting methyl methacrylate in place of the vinyl monomer containing the epoxy group-containing vinyl monomer, was used.

The results are shown in Table 2 together with the results of evaluation of the physical properties.

TABLE 2

| | Composition of compound rubber | | Composition of graft monomer | | | | Species and parts of graft copolymer | Polyarylene sulfide | Izod impact strength (kg · cm/cm) | HDT (°C.) | Appearance | Izod impact strength after pressure cooker test (kg · cm/cm) |
|---|---|---|---|---|---|---|---|---|---|---|---|---|
| | Silicone rubber | Acrylic rubber | GMA | MMA | AN | ST | | | | | | |
| Example 1 | 10 | 80 | 10 | | | | S-1 20 | T-4 80 | 21 | 155 | O | 20 |
| Example 2 | 42 | 42 | 5 | 10 | | | S-2 20 | T-4 80 | 20 | 156 | O | 20 |
| Example 3 | 73 | 12 | 5 | 10 | | | S-3 20 | T-4 80 | 20 | 156 | O | 20 |
| Example 4 | 42 | 42 | 7.5 | 7.5 | | | S-4 20 | T-4 80 | 22 | 155 | O | 21 |
| Example 5 | 42 | 42 | 7.5 | | 2 | 5.5 | S-5 20 | T-4 80 | 21 | 157 | O | 21 |
| Example 6 | 10 | 80 | 10 | | | | S-1 20 | M25 80 | 29 | 151 | O | 28 |
| Example 7 | 42 | 42 | 5 | 10 | | | S-2 20 | M25 80 | 25 | 152 | O | 24 |
| Example 8 | 73 | 12 | 5 | 10 | | | S-3 20 | M25 80 | 26 | 150 | O | 25 |
| Example 9 | 10 | 80 | 10 | | | | S-1 10 | M25 90 | 16 | 157 | O | 15 |
| Example 10 | 10 | 80 | 10 | | | | S-1 30 | M25 70 | 34 | 141 | O | 32 |
| Comparative Example 1 | 100 | | | | | | S-9 20 | T-4 80 | 8 | 154 | X | 3 |
| Comparative Example 2 | 11 | 88 | | | | | S-10 20 | T-4 80 | 11 | 154 | X | 3 |
| Comparative Example 3 | 85 | | 5 | 10 | | | S-6 20 | T-4 80 | 10 | 155 | X | 2 |
| Comparative Example 4 | | 85 | 5 | 10 | | | S-7 20 | T-4 80 | 12 | 153 | O | 3 |
| Comparative Example 5 | 10 | 80 | | 10 | | | S-8 20 | T-4 80 | 12 | 154 | X | 3 |

Note:
Abbreviations in the table mean the following:
GMA: glycidyl methacrylate
MMA: methyl methacrylate
AN: acrylonitrile
ST: styrene
T-4: Tohpren T-4
M25: Ryton M2588

Example 11

The latex of a graft copolymer was obtained in the same manner as in Referential Example 6 except that 10 parts of glycidyl acrylate was used in place of 10 parts of glycidyl methacrylate. The conversion of glycidyl acrylate was 97.9%, and the average particle size of the graft copolymer latex was 0.23 μm. This latex was coagulated, filtered off and dried to obtain a dry powder. Evaluation was carried out in the same manner as in Example 1 using this dry powder to find that the Izod impact strength was 20 kg.cm/cm, HDT was 155° C. and the appearance was good (indicated by symbol o). The Izod impact strength after the pressure cooker test for 100 hr was 20 kg.cm/cm (retention 100%).

Example 12

The latex of a graft copolymer was obtained in the same manner as in Referential Example 6 except that a mixture of 5 parts of diglycidyl itaconate and 5 parts of methyl methacrylate was used in place of 10 parts of glycidyl methacrylate. The conversion of diglycidyl itaconate and methyl methacrylate was 98.1%, and the average particle size of the graft copolymer latex was 0.23 μm. This latex was coagulated, filtered off and dried to obtain a dry powder. Evaluation was carried out in the same manner as in Example 1 using this dry powder to find that the Izod impact strength was 21 kg.cm/cm, HDT was 155° C. and the appearance was good (indicated by symbol o). The Izod impact strength after the pressure cooker test for 100 hr was 21 kg.cm/cm (retention 100%).

Example 13

20 parts of S-1, 80 parts of Tohpren T-4 and 67 parts of GF was blended, pelletized and evaluated in the same manner as in Example 1.

The Izod impact strength was 22 kg.cm/cm, HDT was 256° C., the appearance was good (indicated by symbol o) and the izod impact strength after the pressure cooker test was 21 kg.cm/cm.

What is claimed is:

1. A polyarylene sulfide resin composition obtained by melt-mixing a mixture comprising
(A) a polyarylene sulfide resin and
(B) a polyorganosiloxane graft copolymer obtained by graft-polymerizing one or more kinds of vinyl monomer containing at least an epoxy group-containing vinyl monomer onto a compound rubber in which a polyorganosiloxane rubber and a polyalkyl (meth) acrylate rubber have been inseparably united with each other, wherein the proportion of said polyorganosiloxane graft copolymer derived from said one or more kinds of vinyl monomer is 5–50 wt. % based on a total weight of said polyorgano-siloxane graft copolymer.

2. A polyarylene sulfide resin composition according to claim 1, wherein said polyarylene sulfide resin is a polyphenylene sulfide resin.

3. A polyarylene sulfide resin composition according to claim 1, wherein said compound rubber is one obtained by polymerizing an alkyl (meth)acrylate, a crosslinking agent for a polyalkyl (meth)acrylate rubber and a graft-linking agent for a polyalkyl (meth)acrylate rubber in the presence of a polyorganosiloxane rubber obtained by emulsion-polymerizing organosiloxane, a crosslinking agent for a polyorganosiloxane rubber and, optionally, a graft-linking agent for a polyorganosiloxane rubber.

4. A polyarylene sulfide resin composition according to claim 1, wherein the proportion of said polyorganosiloxane graft copolymer derived from said epoxy group-containing vinyl monomer is 1 to 40 wt. % based on the total weight of said polyorganosiloxane graft copolymer.

5. A polyarylene sulfide resin composition according to claim 1, wherein said polyorganosiloxane graft copolymer has an average particle size of 0.08 to 0.6 μm.

6. A polyarylene sulfide resin composition according to claim 1, wherein the amount of the polyorganosiloxane graft copolymer is 1–70 parts by weight per 100 parts by weight of the polyarylene sulfide resin.

7. A polyarylene sulfide resin composition according to claim 1 which contains 10 to 300 parts by weight of a filler per 100 parts by weight of the total amount of the resin components comprising as main resins the polyarylene sulfide resin (A) and the polyorganosiloxane graft copolymer (B).

8. A polyarylene sulfide resin composition according to claim 1, wherein the proportion of said polyorganosiloxane graft copolymer derived from said epoxy group-containing vinyl monomer is 5–30 wt. % based on the total weight of said polyorganosiloxane graft copolymer.

* * * * *